3,290,383
PROCESS FOR THE PREPARATION OF
HYDROXYTHIOLS
Bernard Pflugfelder, Artix, Basses Pyrenees, and Paul Vannel, Lagor, Basses Pyrenees, France, assignors to Societe Nationale des Petroles d'Aquitaine, Paris, France
No Drawing. Filed Jan. 13, 1964, Ser. No. 337,141
Claims priority, application France, Jan. 14, 1963, 921,353
6 Claims. (Cl. 260—609)

The present invention relates to a new process for obtaining hydroxythiols, and particularly ethane-1-hydroxy-2-thiol, known under the name of mercaptoethanol, compound which is useful as corrosion inhibitor, as an ingredient of textiles sizing compositions, and as intermediate reagent in the preparation of pharmaceutical products.

The known processes of preparation are based on the action of ethylene oxide, or liquid or gaseous homologues of this oxide, on liquid or gaseous hydrogen sulphide in excess, in the presence of various catalysts, such as iron sulphide or kaolin. The operation takes place under heat. It is also known to operate in the presence of solvents, such as for example thiodiglycol, which catalyses the formation of hydroxythiol. However, this operational procedure leads to relatively low yields in hydroxythiol, which generally do not exceed 50%; on the other hand, it is mainly the thiodiglycols which are obtained.

The present invention offers the advantage, as compared with the prior art, of making it possible to work at lower temperatures and possibly even at ambient temperatures, while obtaining liquid products which can contain up to 80% of the desired hydroxythiol. Another advantage of the new process consists in the use of certain catalysts which are much easier to handle and which do not require any special preparation; these catalysts are presently available in commerce, and lead to results which can be satisfactory reproduced.

The new process according to the invention consists in causing an alkylene oxide to react with hydrogen sulphide in the presence of a catalyst formed by an ion exchanger resin.

Among the various known cationic and anionic ion exchanger resins, such as for example the resins which are based on sulphonated phenol-formaldehyde products, polyamines, polyamines of styrene-divinylbenzene copolymers, methacrylic resins, quaternary ammonium derivatives of styrene copolymers, ureaformaldehyde, etc., more especially known under the name of Amberlites or Dowex, the exchanger resins based on polyamines are particularly suitable for carrying the present invention into effect.

Thus, according to a preferred form of the invention, the catalyst is formed by a slightly acid or basic, cationic or anionic ion exchanger resin. Several of these resins may possibly be used together. Among the catalysts according to the invention, there may be mentioned the resins known commercially under the trademarks Dowex II/OH⁻ (polyamine), Amberlites such as IR 45/OH⁻ (polyamine of a styrene-divinylbenzene copolymer), IRA 401/Cl⁻ (quaternary ammonium derivative of styrene-divinyl-benzene copolymer), IR 50/H⁺ (methacrylic resin) etc.

In the presence of these catalysts, the reaction between the alkylene oxide and the $H_2S$ can be effected at lower temperatures than hitherto, namely, between 0° and 100° C. and more particularly between 15° and 45° C.

According to another feature of the invention, the reaction medium is diluted by means of an inert fluid; when the alkylene oxide is gaseous, as is the case for example with ethylene oxide, the diluent fluid is an inert gas such as nitrogen or carbon dioxide gas. The diluent fluid serves to evacuate the amount of heat produced by the reaction, the exothermal nature of which is fairly high.

As the reaction used in the new process is influenced by different factors, particularly by the proportions of the gases which are present, the space velocity of these gases, the temperature and the nature of the catalyst which is chosen, it is advisable to adjust these different parameters with a view to obtaining the best result; the following non-limitative examples will enable a person skilled in the art to understand how to adjust the various factors in question.

Example 1

A column provided with a heat regulation means is filled with grains of the ion exchanger resin known commercially under the trademark Dowex II/OH⁻. A mixture of ethylene oxide and hydrogen sulphide in the molar ratio 1:2 is caused to pass through the bed of this resin. The column is kept at 40 C. and the space velocity of the gas is 450 litres/hour per litre of catalyst bed. At the outlet from the column, mercaptoethanol $$(HS-CH_2-CH_2-OH)$$

is obtained with a yield of 72%.

Example 2

The column of Example 1 is charged with the resin known as Amberlite IR 45/OH⁻. The working conditions are the same as in Example 1, and the mercaptoethanol is obtained with a yield of 75%.

Example 3

By replacing the resin of Example 2 by Amberlite IRA 401/Cl⁻, a yield of 62% is obtained.

Example 4

Instead of the Dowex resin, but using the same working procedure as that indicated in Example 1, a mixture of equal parts of the resins Amberlite IR 50/H⁺ and IR 45/OH⁻ is used; the yield then obtained is 50%.

Example 5

The working procedure of Example 2 was modified in the following manner; the temperature was regulated to 25° C., the space velocity to 100 and the reaction medium was diluted with nitrogen at the rate of 1 volume of $N_2$ to 1 volume of ethylene oxide. There was then obtained a yield of 79.5% of mercaptoethanol.

Example 6

The working procedure of Example 2 was modified in the following manner: the temperature was adjusted to 30° C., the space velocity remaining the same as before, i.e. 450, and the reaction medium was diluted with nitrogen at the rate of 1.2 volumes of $N_2$ to 1 volume of ethylene oxide. The yield was then 60% of mercaptoethanol.

Example 7

In Example 6, the ratios of the gases were modified, namely: 3 volumes of $H_2S$ to 2 volumes of ethylene oxide and 1.8 volumes of nitrogen. This resulted in a yield of 57%.

Example 8

In the procedure of Example 2 ethylene oxide is replaced by 1,2-propylene oxide. Then 1-thiol 2-propanol is obtained with a yield of 73%.

Example 9

Instead with propylene oxide, Example 8 is carried out with 1-monochloro-2,3-propylene oxide, and 1-chloro-3- thiol-2-propanol ClCH$_2$—CHOH—CH$_2$SH is obtained with a yield of approximately 72%.

We claim:
1. A process for the preparation of hydroxythiols, which comprises reacting an alkylene oxide with hydrogen sulphide at a temperature between 0° C. and 100° C. in the presence of a catalyst consisting of an exchange resin selected from the group consisting of sulphonated phenol-formaldehyde resins, polyamines, polyamines of styrene-divinylbenzene copolymers, methacrylic resins, quaternary ammonium derivatives of styrene copolymers and urea-formaldehyde resins to form the corresponding hydroxythiol.

2. A process for the preparation of hydroxythiols which comprises passing a mixture of an alkylene oxide of 2 to 4 carbon atoms with hydrogen sulphide at a temperature between 0° C. and 100° C. through a bed of particulate catalyst consisting of an ion exchange resin selected from the group consisting of sulphonated phenol-formaldehyde resins, polyamines, polyamines of styrene-divinylbenzene copolymers, methacrylic resins, quaternary ammonium derivatives of styrene copolymers and urea-formaldehyde resins to form the corresponding hydroxythiol.

3. A process according to claim 2 wherein the temperature of the mixture during said reaction is maintained at a temperature of from 0° C. to 50° C.

4. A process for the preparation of hydroxythiols which comprises passing a mixture of an alkylene oxide selected from the group consisting of ethylene oxide, 1,2-propylene oxide and 1-monochloro-2,3-propylene oxide with hydrogen sulphide, at a temperature between 0° C. and 50° C., the molar ratio of hydrogen sulphide to alkylene oxide being 1.5 to 2 moles of hydrogen sulphide per mole of alkylene oxide in the presence of a catalyst consisting of an ion exchange resin selected from the group consisting of a styrene-divinylbenzene copolymer polyamine, a quaternary ammonium derivative of a styrene-divinylbenzene copolymer, a polyamine and a methacrylic resin to form the corresponding hydroxythiol.

5. A process according to claim 4 wherein the alkylene oxide is gaseous.

6. A process according to claim 5 wherein the alkylene oxide is diluted with an inert gas selected from the group consisting of nitrogen and carbon dioxide.

References Cited by the Examiner
FOREIGN PATENTS
676,891  8/1952  Great Britain.

OTHER REFERENCES
Berbe: Bull. Soc. Chim. Belges., 59, 499–64 (1950).

CHARLES B. PARKER, *Primary Examiner.*

D. R. PHILLIPS, *Assistant Examiner.*